United States Patent
Gerlach et al.

(10) Patent No.: US 9,344,296 B2
(45) Date of Patent: May 17, 2016

(54) ACCESS PROTECTION ACCESSORY FOR AN AUTOMATION NETWORK

(75) Inventors: Hendrik Gerlach, Erlangen (DE); Wolfgang Schmid, Schwarzenbruck-Lindelburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/440,766

(22) Filed: Apr. 5, 2012

(65) Prior Publication Data

US 2012/0260305 A1    Oct. 11, 2012

(30) Foreign Application Priority Data

Apr. 8, 2011    (EP) .................................... 11161630

(51) Int. Cl.
| | |
|---|---|
| *G06F 17/00* | (2006.01) |
| *H04L 12/40* | (2006.01) |
| *H04L 29/06* | (2006.01) |
| *H04L 29/08* | (2006.01) |

(52) U.S. Cl.
CPC ...... *H04L 12/40006* (2013.01); *H04L 63/0236* (2013.01); *H04L 67/12* (2013.01); *H04L 2012/4026* (2013.01)

(58) Field of Classification Search
CPC .............. H04L 12/40006; H04L 67/12; H04L 63/0236; H04L 2012/4026
See application file for complete search history.

(56) References Cited

U.S. PATENT DOCUMENTS

| 6,085,084 A * | 7/2000 | Christmas ............. H04W 12/12 455/411 |
|---|---|---|
| 7,200,660 B2 * | 4/2007 | Bruegger ........... G05B 19/4185 709/219 |

(Continued)

FOREIGN PATENT DOCUMENTS

| EP | 1 283 632 | 2/2003 |
|---|---|---|
| WO | WO 2005/047991 | 5/2005 |

OTHER PUBLICATIONS

Office Action dated May 30, 2014 issued in the corresponding Chinese Patent Application No. 201210103438.3.

*Primary Examiner* — Fatoumata Traore
*Assistant Examiner* — Khoi Le
(74) *Attorney, Agent, or Firm* — Cozen O'Connor (57) ABSTRACT

An automation network connected to an automation installation configured to perform an automation process executable in at least two states, where the access protection accessory comprises network ports, a digital storage medium configured to store at least first and second rules, and a processor configured to read the at least first and second rules, process the rules and receive and forward data via the network ports, and receive at least one signal comprising advice of a change in the state of the automation process. The first rules, in a first state of the automation process, define which received data are forwarded and which received data are not forwarded, and following reception of the at least one signal the second rules define which received data are forwarded and which received data are not forwarded.

15 Claims, 3 Drawing Sheets

(56) References Cited

U.S. PATENT DOCUMENTS

| | | | | |
|---|---|---|---|---|
| 7,227,864 B2* | 6/2007 | Collins | ............. | H04L 29/12009 370/392 |
| 7,593,451 B2* | 9/2009 | Kwon | ................... | H04B 1/7093 375/147 |
| 7,831,256 B2* | 11/2010 | Morita | ................... | H04W 28/02 455/450 |
| 8,046,499 B2* | 10/2011 | Seiler | ................... | G06F 13/4282 709/246 |
| 2003/0105812 A1* | 6/2003 | Flowers, Jr. | ........... | H04L 63/029 709/203 |
| 2004/0153171 A1* | 8/2004 | Brandt | ................... | G05B 15/02 700/9 |
| 2006/0053491 A1* | 3/2006 | Khuti | ..................... | H04L 63/02 726/23 |
| 2006/0075472 A1* | 4/2006 | Sanda | ................... | G06F 21/316 726/3 |
| 2007/0019641 A1* | 1/2007 | Pai | ......................... | H04L 29/06 370/389 |
| 2008/0320582 A1* | 12/2008 | Chen | ................... | H04L 63/0245 726/12 |
| 2011/0072506 A1* | 3/2011 | Law | .................... | H04L 63/0227 726/11 |

* cited by examiner

ACCESS PROTECTION ACCESSORY FOR AN AUTOMATION NETWORK

BACKGROUND OF THE INVENTION

1. Field of the Invention

The invention relates to an access protection accessory for an automation network, and more particularly, to an access protection accessory for an automation network connected to an automation installation.

2. Description of the Related Art

Automation accessories are today increasingly being networked via Ethernet. This means that the topic of network security is also becoming increasingly important. It is known to protect delimitable areas by security accessories on the boundaries of an amber. In automation engineering, this is reflected in a cell concept. Typical security accessories are firewalls. These track the protocol sequence and check not only source and destination addresses and other important protocol parameters but also the protocol state. Such firewalls are therefore also called stateful packet inspection firewalls.

SUMMARY OF THE INVENTION

It is an object of the invention to provide an improved access protection accessory for an automation network, an improved method for operating an access protection accessory and an improved digital storage medium for an access protection accessory.

This and other objects and advantages are achieved in accordance with the invention by an access protection accessory for an automation network which is connected to an automation installation which is configured to perform an automation process. For example, an automation process can be understood to mean an automated fabrication or production process. These, and also other automated processes, are referred to as automation processes in this case.

An automation network may comprise an industrial automation network, for example. Such industrial automation networks may be configured, set up and/or provided to control and/or regulate industrial automation installations (e.g., production installations or conveyor installations), machines and/or accessories, for example. In particular, automation networks or industrial automation networks may have realtime communication protocols (e.g., Profinet, Profibus, Real-Time Ethernet) for the communication at least between the components involved in the control and/or regulatory tasks (e.g., between the control units and the installations and/or machines to be controlled). Furthermore, the automation network connects components for monitoring and conducting the automation process to the control and regulatory components and also to one another. This also includes direct operation and observation of the control and regulatory components. The secure transmission of data via storage media is likewise covered.

In addition, besides a realtime communication protocol, there may alternatively also be at least one further communication protocol (which does not need to have realtime capability, for example) in the automation network or industrial automation network, e.g., for the purpose of monitoring, setting up, reprogramming or reparameterizing one or more control units in the automation network. It should be noted that it is also possible for communication to occur in the automation network that is not effected in real time. Such communication is effected using automation-specific protocols.

An automation network may comprise wired communication components and/or wireless communication components, for example. Furthermore, an automation network may comprise at least one automation device.

For example, an automation device may be a computer, PC and/or controller (PLC) having control and/or regulatory tasks or control and/or regulatory capabilities. In particular, an automation device may be an industrial automation device, for example, which may be configured, set up and/or provided specifically for controlling and/or regulating industrial installations, for example. In particular, such automation devices or industrial automation devices may have realtime capability, i.e., allow control or regulation in realtime. To this end, the automation device or the industrial automation device may comprise a realtime operating system, for example, and/or, at least inter alia, may support a realtime-compatible communication protocol for communication (e.g. Profinet, Profibus, Real-Time Ethernet).

An automation installation connected to the automation network comprises one or more sensors and actuators. The actuators are controlled by at least one control device. Measured values from the sensors can be captured and processed by the control device or by other network accessories. In particular, measured values can also be captured and processed by an access protection accessory in accordance with the disclosed embodiments of the invention. The actuators, the sensors and the at least one control device interchange data with one another. For the data interchange, an automation protocol is used. The at least one control device controls the actuators, the sensors and the data interchange such that an automatic process takes place in which a product is manufactured, for example.

Furthermore, for connecting sensors, it is also possible to use connections that do not use an automation protocol. By way of example, measured values from a sensor can also be transmitted over wire lines to network accessories and/or an access protection accessory in accordance with the disclosed embodiments of the invention.

For example, an industrial automation device may be or comprise a programmable logic controller, a module or part of a programmable logic controller, a programmable logic controller integrated in a computer or PC and corresponding field devices, sensors and/or actuators, input and/or output devices or the like for connection to a programmable logic controller. A programmable logic controller integrated in a computer or PC may, in particular, be a controller which is software-implemented. In this case, there is thus no hardware component present which exclusively performs the function of the programmable logic controller. For example, a software-implemented controller can be executed on a processor in the computer or PC which is also used for other functions of the computer or PC.

An automation protocol within the meaning of the present invention is understood to mean any kind of protocol that is provided, suitable and/or set up for communicating with automation devices in accordance with the disclosed embodiments of the present invention. By way of example, such automation protocols may be the PROFIBUS protocol (e.g., according to International Electrotechnical Commission (IEC) standard 61158/EN50170), a PROFIBUS-DP protocol, a PROFIBUS-PA protocol, a PROFINET protocol, a PROFINET-IO protocol, a protocol based on AS-Interface, a protocol based on IO-Link, an KNX protocol, a protocol based on a multipoint interface (MPI), a protocol for point-to-point coupling (PtP), a protocol based on the specification of S7 communication (which is provided and set up for the communication of programmable logic controllers from the Siemens company, for example) or else an Industrial Ethernet protocol or Real-Time Ethernet protocol or further specific protocols for communication with automation accessories, such as Modbus, Force Feedback (FFB) or others. The automation protocol provided within the meaning of the present description may also be any combinations of the aforementioned protocols.

The automation process can be executed in at least two states. For example, the first state is the normal operating state of the automation process and the second state is a state that does not correspond to the normal operating state. This may be due to one or more accessories in the automation installation failing or particular measurement parameters not corresponding to the setpoint values, for example. This may also be the case, for example, when the process is impaired or fails on account of the fault in a process engineering component which is controlled by the automation network, for example, and performs the production or fabrication process, for example.

The automation network also includes accessories which are locally isolated from a main part of the automation network but which are connected to the automation network via a secured connection. Such a secured connection may be a VPN tunnel, for example.

The access protection accessory comprises a digital storage medium, a processor device and network ports. The digital storage medium is configured to store at least first and second rules. The processor device may comprise one or more processors, for example, which execute program instructions. The processor device is configured to read the at least first and second rules, to process the at least first and second rules and to receive and forward data via the network ports. The network ports can thus be used by the access protection accessory to receive data from the automation network and/or from the automation installation and also to forward data from the access protection accessory to the automation network. The access protection accessory may thus be connected either solely to the automation network or both to the automation network and to the automation installation, particularly the sensors thereof.

The first rules, in a first state of the automation process, define which received data are forwarded and which received data are not forwarded. The decision about forwarding the data can be obtained with respect to the transmitter and the receiver of the data or else with respect to the type of the data, for example. The rules thus define the access rights of accessories from inside or outside of the automation network and/or the automation installation to other accessories in the automation network and/or in the automation installation. For example, the first state may be the normal operating state of the automation installation. This means that the automation process is executed as planned.

The processor device is furthermore configured to receive at least one signal. The at least one signal may comprise advice of a change in the state of the automation process. For example, a change of state may have arisen when the automation process is no longer being executed as planned. For example, these may also be installation or process states which can be encountered recurrently, for example, startup, maintenance, diagnosis, fault, emergency or a critical state for a measured value, such as temperature, pressure, flow rate, liquid level or the failure of an accessory in the automation installation.

The at least one signal may comprise the advice of the state change directly, for example. Alternatively, the signal may also comprise one or more measured values which are then analyzed by the processor device, as a result of which the processor device itself determines whether there is a state change in the automation process. Following reception of the at least one signal, the second rules define which received data are forwarded and which received data are not forwarded. The second rules thus comprise access rights in the same way as the first rules, but the second rules are different than the first rules.

As an example, the second rules may define access rights which are such that rectification of the fault, startup, maintenance, diagnosis or analysis of a problem can be performed by a user using an accessory in the automation network, which is not possible on the basis of the access rights of the first rules.

Alternatively, the second rules may define access rights such that access to the automation installation is prevented by an accessory in the automation network so that a chemical or other process can proceed unperturbed within the automation installation.

In accordance with other embodiments of the invention, the processor device is configured to receive the at least one signal through at least one of the network ports. In other words, the signal can be received directly, for example, from the automation installation, for example from a sensor, or from an accessory in the automation network.

In accordance with the disclosed embodiments of the invention, the access protection accessory comprises a port for receiving the at least one signal. The at least one signal comprises at least one measurement parameter from the automation process which has been measured by a sensor in the automation installation.

In other embodiments of the invention, the processor device is configured to compare the at least one measurement parameter with a threshold value. For example, the measurement parameter may have been measured by a sensor in the automation installation and may be a liquid level, a flow rate, a pressure or a temperature. The processor device compares this at least one measurement parameter with at least one threshold value. If there are a plurality of measurement parameters, the plurality of measurement parameters are also compared with a plurality of threshold values. Here, a measured value is always compared with the associated threshold value. For example, this means that a pressure value is also always compared with the threshold value for this pressure value. It is also possible for a plurality of measured values of the same kind to be compared with a plurality of threshold values of the same kind. For example, a plurality of temperature values can be compared with a plurality of threshold values for these temperature values. Here, temperature value A would be compared with temperature threshold value A, temperature value B would be compared with temperature threshold value B, etc.

The comparison is performed by the processor device by computation operation. For example, these may comprise scaling or linearization. The processor device detects the change in the state of the automation process if the at least one measurement parameter is above or below the at least one threshold value. Thus, a state change in the automation process is detected by the processor device. Following this state change, no longer the first rules but rather the second rules are applied by the processor device. The second state may be an emergency state or a maintenance state, for example.

In another embodiment of the invention, the processor device is configured to receive a plurality of signals and/or the at least one signal comprises a plurality of measurement parameters. The processor device is configured to detect a state change in the automation process by applying computation operations to the plurality of measurement parameters.

For example, these computation operations may be scaling or linearization. For example, it is also conceivable that when a plurality of measurement parameters are received, only some of these measurement parameters need to be above or below the respective threshold values. For example, the processor device may be configured such that a state change in the automation process is detected if two of three measurement parameters are above or below the respective threshold values.

In an embodiment of the invention, the first and second rules define access rights based on a transmitter and a receiver of the data. In addition, it is also possible to take into account the type of the data.

In another embodiment of the invention, the first rules are combined in at least one first rule group and the second rules are combined in at least one second rule group. The combination of the rules in rules groups improves the clarity for the user. For example, there may be a rule group according to which all access operations to network accessories in the automation network are blocked. This could be the first rule group, for example. The second rule group could then permit an emergency control center in the automation network to access a server in the automation network in the event of a fault.

In an embodiment of the invention, the first state of the automation process is an operating state and the second state is an emergency state. The second rules allow access to all network accessories in the automation network from an emergency inspection network accessory. This allows the user to take measures quickly in the event of an emergency state in order to terminate the emergency state. This is done automatically by virtue of the processor device receiving the first signal. The user thus does not need to permit the access by the emergency inspection network accessory manually. This allows rapid intervention in the case of an emergency state in the automation process.

In an embodiment of the invention, the first state of the automation process is an operating state and the second state is an emergency state. The second rules allow access to all network accessories in the automation network from any network accessory in the automation network. Here, a user is thus able to remedy the emergency state from any network accessory in the automation network without the access rights needing to be changed manually.

The use of the second rules instead of the first rules can also be referred to as a change in the state of the automation network. Here, the first rules define a first state of the automation network and the second rules define a second state of the automation network. Since changeover of the state of the automation network is initiated automatically by a state change in the automation process, the state of the automation network always follows the state of the automation process without the protocol state of the automation network needing to be changed manually. This is advantageous in order to be able to react quickly to changing process states of the automation process.

It is also an object of the invention to provide an automation system having an automation installation and an automation network.

It is also an object of the invention to provide a method for operating an access protection accessory in an automation network which is connected to an automation installation which is configured to perform an automation process. The method comprises the following steps.

The automation process is initially performed in a first state. Here, the first rules are read from a storage medium in the access protection accessory by a processor device in the access protection accessory. The first rules define access rights for access from a first subnetwork of the automation network to a second subnetwork of the automation network. When the first rules are applied by the processor device, the first rules define which data are forwarded and which data are not forwarded. This may be dependent on the type of the data, on the transmitter of the data and on the receiver of the data.

If the state of the automation process changes, the processor device in the access protection accessory receive at least one signal which comprises advice of the state change in the automation process. In this case, the processor device reads second rules from the storage medium and apply these rules. The second rules define which received data are forwarded and which received data are not forwarded. The second rules thus also define access rights, which are different than the first rules, however.

In an embodiment of the invention, the at least one signal comprises at least one measurement parameter from the automation process, which measurement parameter has been measured by a sensor in the automation installation. When the signal is received, the processor device compares the at least one measurement parameter with at least one associated threshold value. The processor device detects a change in the state of the automation process if the measurement parameter is above or below the at least one threshold value.

In accordance with the disclosed embodiments of the invention, the first and second rules define access rights based on a transmitter and a receiver of the data. The type of the data can also define the access rights. The type of the data is understood here to mean particularly automation data or else data from different automation subprotocols, Internet data, video data or monitoring data, for example.

In accordance with the disclosed embodiments of the invention, the first rules are combined in at least one first rule group and the second rules are combined in at least one second rule group. This increases the clarity for the user.

It is a further object of the invention to provide a non-transitory digital storage medium for an access protection accessory in an automation network which is connected to an automation installation which is configured to perform an automation process. The digital storage medium comprises program instructions which, when executed, prompt the access protection accessory to perform a method in accordance with the disclosed embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Embodiments of the invention are explained in more detail below with reference to the figures, in which.

DETAILED DESCRIPTION OF THE PREFERRED EMBODIMENTS

Elements in the subsequent figures which correspond to one another are denoted by the same reference symbols.

Figure 1:
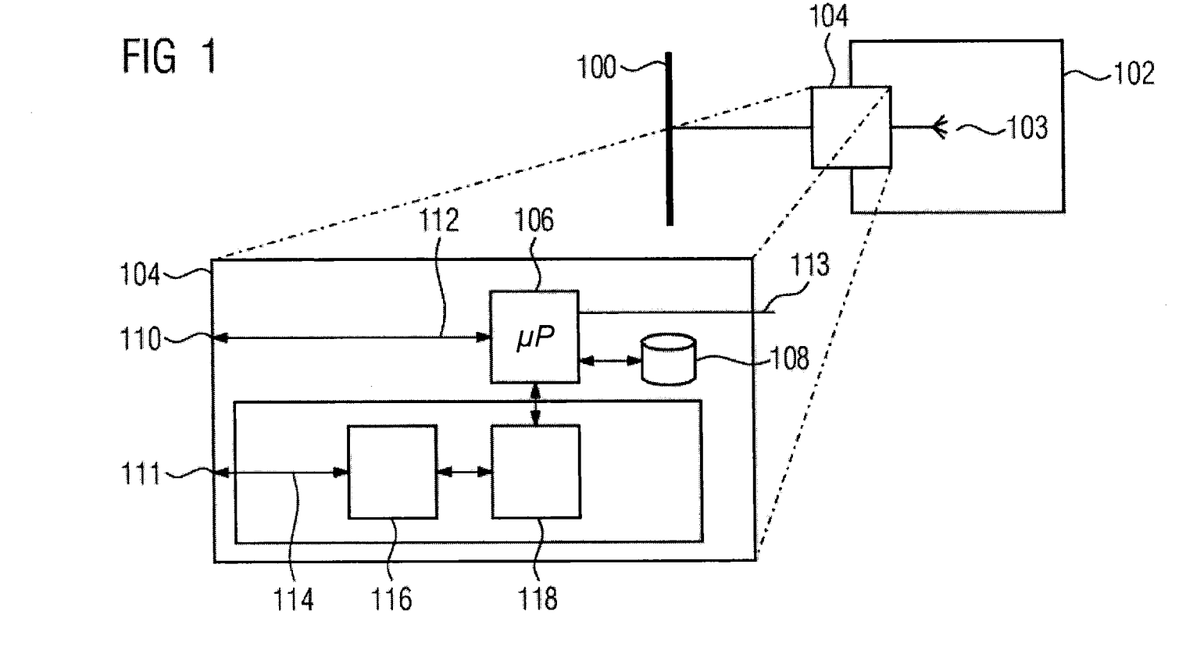
FIG. 1 shows a schematic block diagram of an access protection accessory for an automation network which is connected to an automation installation.

FIG. 1 shows a block diagram of an access protection accessory 104, a first part 100 of an automation network and an automation installation 102, which contains a second part 103 of the automation network. The first automation network part 100 is connected to the second automation network part 103 through the access protection accessory 104. Data which are sent from the first automation network part 100 to the network accessories in the second automation network part 103 are sent through the access protection accessory 104, which forwards the data or blocks forwarding thereof by applying rules. Data which are sent from the second automation network part 103 to the first automation network part 100 are sent through the access protection accessory 104. In this case too, the access protection accessory 104 applies rules to check access rights for various accessories in the automation network part 103 to various accessories in the first automation network part 100. It is also possible for further automation installations 102 with further second automation network parts to be connected to the first automation network part (not shown here). In the operating state, accessories in the first automation network part 100 have no or only restricted access to accessories in the second automation network part 103, for example. Access is prevented or restricted by the access protection accessory 104. Similarly, in the normal operating state, access by an accessory in the automation network part 103 to an accessory in the automation network part 100 can be prevented or restricted by the access protection accessory 104.

The access protection accessory 104 comprises a processor 106 and a digital storage medium 108. The processor 106 is configured to execute program instructions which are stored on the digital storage medium 108. It should be noted that the program instructions can also be executed by a plurality of processors in the access protection accessory. The access protection accessory 104 uses a network port 110 to receive data packets 112 to be filtered, which are processed by the processor 106. The processor 106 is prompted by the execution of the program instructions on the digital storage medium 108 to apply rules which are likewise stored on the digital storage medium 108. The rules can also be stored on another storage medium (not shown here).

Depending on the decision from the rule processing, the data packet 112 to be filtered is sent or else not sent on the output side via network port 113. The rules thus define whether a signal is forwarded or blocked. In the opposite direction, data packets 112 to be filtered are received through network port 113 and possibly sent through network port 110. In this case, the rules also define whether a signal is forwarded or blocked.

The rules to be applied are determined by the process state of the automation process which is being executed in the automation installation 102. In a first process state, the processor 106 applies first rules, and in a second state, the processor applies second rules.

The access protection accessory 104 is likewise configured to use a port 111 to receive a first signal 114. Here, the first signal 114 comprises advice of the state of the automation process which is being executed in the automation installation 102. The port 111 may be a further network port or a port for another connection between the access protection accessory and the automation installation. Said connection may be a two-wire line or else a wireless connection, such as radio or WLAN. Alternatively, the port 111 may coincide with port 110 if 111 also comprises a network port or the signal 114 is transmitted using a network protocol. Furthermore, the signal 114 can be received through the port 113, which connects the access protection accessory 104 to the second automation network part 103.

For example, the signal 114 may comprise one or more measured values which are captured by a capture module 116 from the access protection accessory 104. Alternatively, the one or more values may also be captured by the processor 106. The received measured values can then be logically combined by a combination logic module 118. The logical combination may alternatively also be performed by the processor 106. The logic combination of the measured values allows the processor 106 to perform computation operations, as a result of which it is able to detect a change in the state of the automation process. For example, these computation operations may be scaling operations or linearization operations. A computation operation can also be understood to mean that the measured values are compared with associated threshold values, and a state change is detected when the measured values are above or below the threshold values.

The signal 114 can alternatively also be output to the access protection accessory 104 by another accessory in the automation network part 103, and in this case can comprise advice of a state change in the process state directly, rather than measured values.

The rules that define the access rights may either be itemized individually or may be combined in groups.

In pseudocode, individually itemized rules may have the following appearance, for example:

pass inet proto tcp from <EmergencyConsole> to <Server> when PlantState equal Hardfault This means that access operations using all TCP protocols are permitted from the emergency inspection network accessory to the server when the automation process is perturbed.

A further possible rule in pseudocode could have the following appearance: drop inet proto tcp from <EmergencyConsole> to <Server> when PlantState not equal HardFault This means that access operations from the emergency inspection network accessory to the server using all TCP protocols are disabled when the automation process is not perturbed.

The following rule in pseudocode means that access from a console to a control unit for a boiler is permitted when the boiler reaches a critical temperature: pass inet proto tcp from <Console> to <BoilerPLC> when BoilerTemperature>CriticalLimit Rule groups may have the following appearance in pseudocode, for example:

```
RuleGroup RegularOperation
{
    block inet proto tcp from any to any /* disable everything
*/
}
RuleGroup HardFault
{
    pass inet proto tcp from <EmergencyConsole> to <Server1>
/* permit TCP protocols from the emergency inspection network accessory
to Server1 */
    pass inet proto tcp from <EmergencyConsole> to <Server2>
/* permit TCP protocols from the emergency inspection network accessory
to Server2 */
}
```

A distinction can also be drawn between different types of access. For example, reading may be allowed, whereas writing is prohibited. A further type of access is the execution of executable program instructions, which can be allowed or prohibited individually.

The access protection accessory 104 can also be used to inspect the access to the first automation network part 100 or to a network part in an automation installation part 102 from a further network (e.g., an office network or the Internet). In this case, the access protection accessory 104 is connected to the further network through the network port 110 and the first automation network part 100. Here, the access protection accessory can also be used to inspect access operations from the further network to accessories in the automation network part 103. Such access operations would be effected by the automation network part 100 to the automation network part 103 via the access protection accessory 104.

It is also possible to use two or more access protection accessories 104, for example, if the automation network comprises two or more network parts which are connected to one another via the Internet. One network part may contain a control room, for example, which uses the Internet to access a second network part, e.g., one or more pumping stations, and can control these. Access operations to the first and a second network and access operations from the first and a second network can thus be inspected by the respective access protection accessories.

Figure 2:
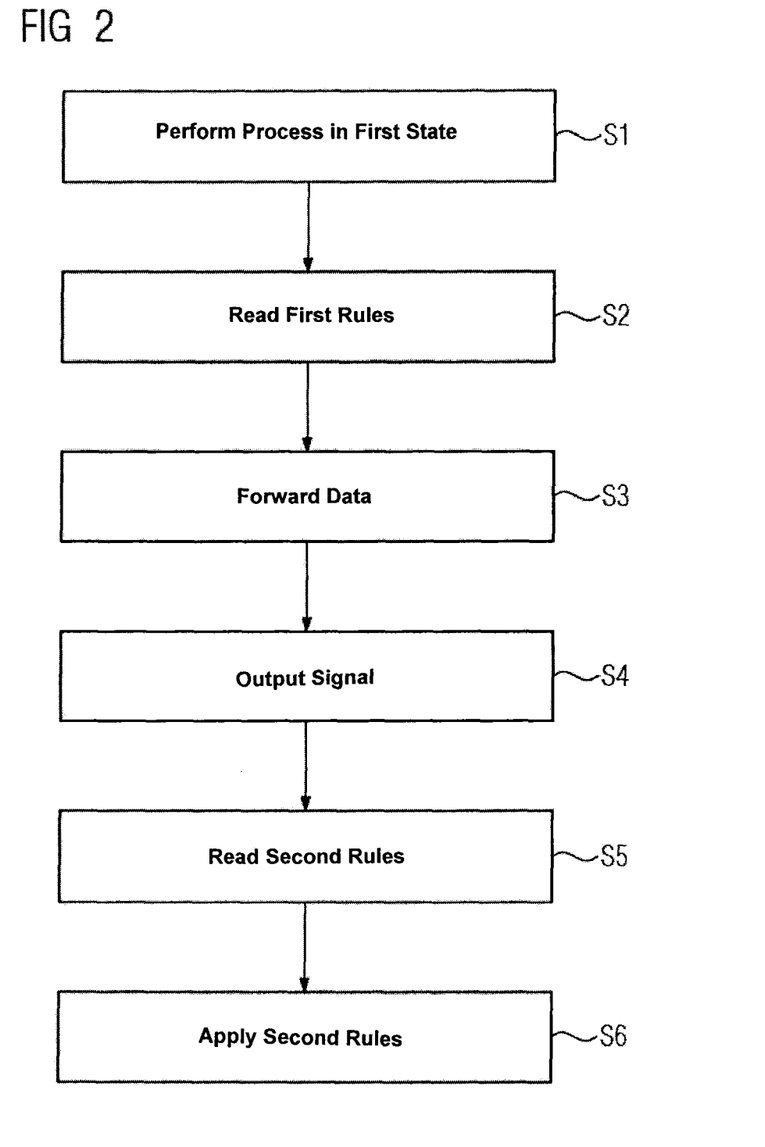
FIG. 2 shows a flowchart of a method in accordance with an embodiment of the invention.

FIG. 2 is a flowchart of a method for operating an access protection accessory in an automation network, which method can be performed by a processor in the access protection accessory by executing program instructions on a digital storage medium in the access protection accessory. In this case, as FIG. 1 shows, the automation network is connected to an automation installation which is configured to perform an automation process. The automation process may be in a first or in a second state.

In a first step S1, the automation process is in a first state. As an example, the first state may be the normal operating state of the automation process. In the case of a fabrication or production process, this may be normal operation of the automation installation. In a second step S2, the processor in the access protection accessory reads first rules from the storage medium in the access protection accessory. The data are forwarded by the access protection accessory by applying the first rules in step S3. Here, the first rules define which data are forwarded and which data are not forwarded. For example, this can be done based on the transmitter, the receiver and the type of the data. In other words, the first rules define first access rights.

If the state of the automation process changes, a signal is output to the access protection accessory in step S4. The signal comprises advice of the state change. The signal is preferably received and processed by the processor in the access protection accessory. In this case, the signal can either comprise the advice of the state change directly or else can comprise measured values which are processed by the processor. In the latter case, the processor itself detects the state change in the automation process. For example, this can be effected by computation operations, such as linearization or scaling, and/or by simply comparing the measured values with associated threshold values, however.

Following reception of the signal, second rules are read from the storage medium by the processor in step S5 and are applied in step S6. The second rules define which data are forwarded and which data are not intended to be forwarded. The second rules thus define access rights for the second state of the automation process. For example, the second state of the automation process may be a fault situation or emergency in which access to all accessories in the automation installation and in the automation network from an emergency inspection network accessory is permitted.

The user is thus rendered able to quickly remedy emergency, maintenance or fault states in the automation process without manual adjustment of the access rights.

Since the protocol state of the automation network is always matched to the process state of the automation process, there is no need for manual changeover. The protocol state of the automation network is defined by the first and second rules. When the first rules are applied, the automation network is in a first protocol state, for example, and when the second rules are applied, it is in a second protocol state.

Figure 3:
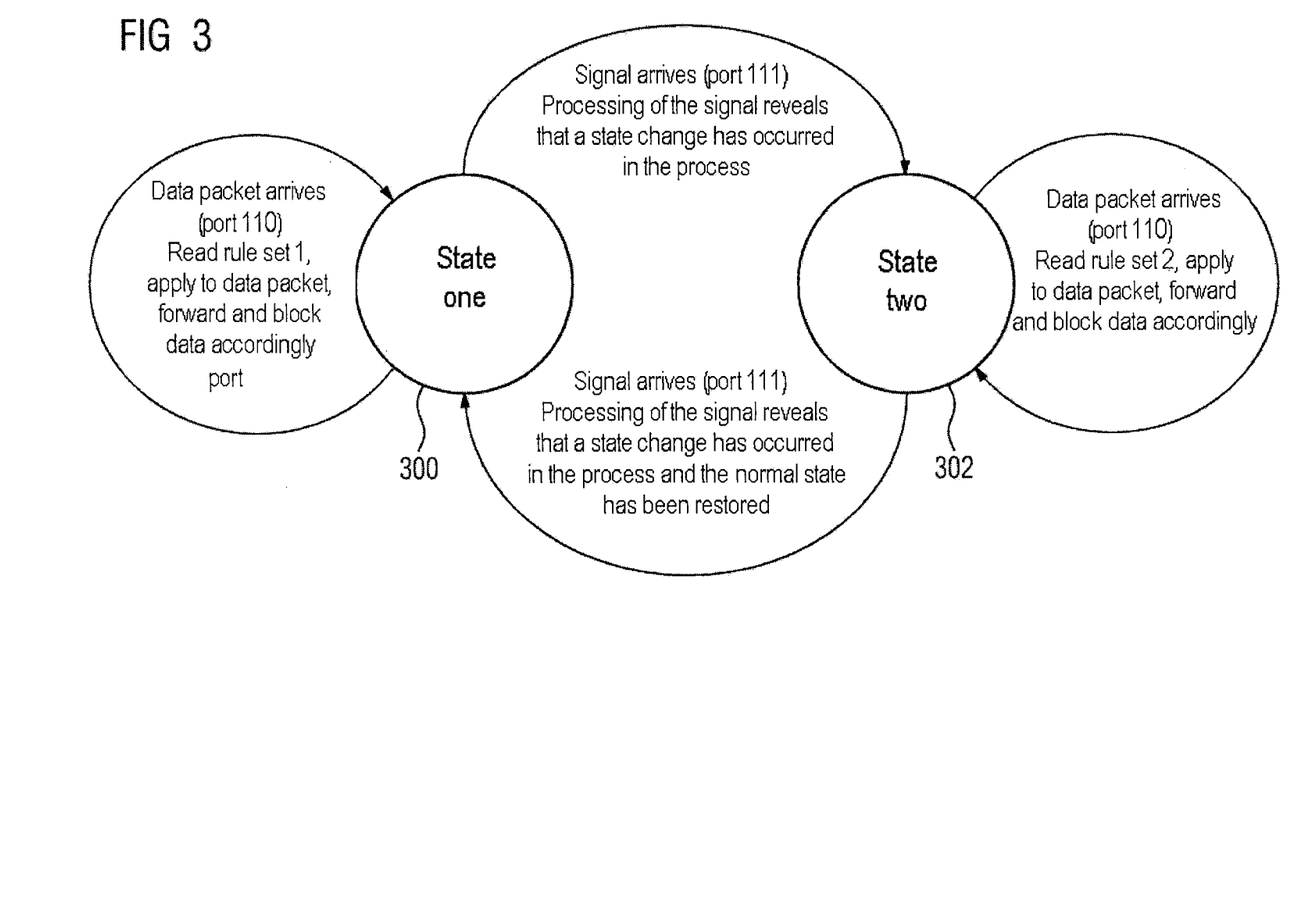
FIG. 3 shows a schematic block diagram of a state diagram illustrating two states of an automation network.

FIG. 3 is a schematic illustration of two states 300 and 302. In the first state 300, when a data packet is received via the port 110 (see FIG. 1) of the access protection accessory, the first rules are read and are applied to the data packet. The data are forwarded or blocked in accordance with the rules.

If the port 111 (see FIG. 1) is now used to receive a signal which comprises advice of a state change in the automation process, the state of the automation network is changed to the second state 302. In the second state 302, port 110 is used to forward or block incoming data packets based on the second rules.

If a further signal comprising advice of a state change in the automation process is received while the automation network is in the second state 302, the state of the automation network is changed to the first state 300.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An access protection accessory for an automation network which is connected to an automation installation configured to perform an automation process executable in at least two states, the access protection accessory comprising:
a digital storage medium configured to store at least first rules and second rules;
a combinational logic module configured to perform scaling operations or linearization operations in which at least one measurement parameter is compared with at least one associated threshold value, and a state change is detected when the at least one measurement parameter is above or below the at least one associated threshold value;
network ports; and
a processor configured to read the at least first and second rules, process the at least first rules and second rules and receive and forward data from the access protection accessory through the network ports;

wherein the first rules, in a first state of the automation process, define which received data are forwarded from the access protection accessory and which received data are not forwarded from the access protection accessory;

wherein the processor is further configured to receive at least one signal at the combinational logic module indicating a change in a state of the automation process and detect the change in the state of the automation process by evaluating the signal; and wherein, following reception of the at least one signal, the second rules define which received data are forwarded from the access protection accessory and which received data are not forwarded from the access protection accessory.

2. The access protection accessory as claimed in claim 1, wherein the processor is configured to receive the at least one signal through at least one network port of the network ports.

3. The access protection accessory as claimed in claim 1, wherein the access protection accessory comprises a separate port for receiving the at least one signal, and wherein the at least one signal comprises the at least one measurement parameter from the automation process, the at least one measurement parameter being measured by a sensor in the automation installation.

4. The access protection accessory as claimed in claim 1, wherein the processor is further configured to receive a plurality of signals, wherein the at least one signal comprises a plurality of measurement parameters, and wherein the processor is further configured to detect the change in the state of the automation process by applying computational operations to the plurality of measurement parameters.

5. The access protection accessory as claimed in claim 1, wherein the at least first rules and second rules define access rights based on a transmitter and a receiver of the data.

6. The access protection accessory as claimed in claim 1, wherein the first rules are combined in at least one first rule group and the second rules are combined in at least one second rule group.

7. The access protection accessory as claimed in claim 1, wherein the first state of the automation process is an operating state and the second state is an emergency state; and wherein the second rules allow access to all network accessories in the automation network from an emergency inspection network accessory.

8. The access protection accessory as claimed in claim 1, wherein the first state of the automation process is an operating state and the second state is an emergency state, and wherein the second rules allow access to all network accessories in the automation network from any network accessory in the automation network.

9. An automation system comprising:
at least one automation installation configured to perform an automation process;
at least one automation network connected to the automation installation via an access protection accessory comprising a digital storage medium configured to store at least first rules and second rules, network ports, a combinational logic module configured to perform scaling operations or linearization operations in which at least one measurement parameter is compared with at least one associated threshold values, and a state change is detected when the at least one measurement parameter is above or below the at least one associated threshold value, and a processor arranged in the access protection accessory and configured to read the at least first rules and second rules, process the rules and receive and forward data from the access protection accessory through the network ports;

wherein the first rules, in a first state of the automation process, define which received data are forwarded from the access protection accessory and which received data are not forwarded from the access protection accessory;

wherein the processor arranged in the access protection accessory is further configured to receive, through one network port of the network ports from the automation installation, at the combinational logic module at least one signal indicating a change in a state of the automation process and detect the change in a state of the automation process by evaluating the signal; and wherein, following reception of the at least one signal, the second rules define which received data are forwarded from the access protection accessory and which received data are not forwarded from the access protection accessory.

10. A method for operating an access protection accessory in an automation network connected to an automation installation configured to perform an automation process, the method comprising:
performing the automation process in a first state;
reading, first rules from a storage medium arranged in the access protection accessory by a processor arranged in the access protection accessory;
forwarding data from the access protection accessory by applying the first rules, the first rules defining which data are forwarded from the access protection accessory and which data are not forwarded from the access protection accessory;
receiving at least one signal at a combinational logic module arranged in the access protection accessory, said combinational logic module performing scaling operations or linearization operations in which at least one measurement parameter is compared with at least one associated threshold value, and a state change is detected when the at least one measurement parameter is above or below the at least one associated threshold value, and said at least one signal indicating a change in a state of the automation process;
detecting the change in state by evaluating the signal by the processor arranged in the access protection accessory;
reading second rules from the storage medium arranged in the access protection accessory; and
forwarding the data from the access protection accessory, after detecting the change in state, by applying the second rules, the second rules defining which received data are forwarded from the access protection accessory and which received data are not forwarded from the access protection accessory.

11. The method as claimed in claim 10, wherein the at least one signal comprises the at least one measurement parameter from the automation process, the at least one measurement parameter being measured by a sensor in the automation installation.

12. The method as claimed in claim 10, wherein the at least one first rules and second rules define access rights based on a transmitter and a receiver of the data.

13. The method as claimed in claim 11, wherein the at least one first and second rules define access rights based on a transmitter and a receiver of the data.

14. The method as claimed in claim 10, wherein the first rules are combined in at least one first rule group and the second rules are combined in at least one second rule group.

15. A non-transitory digital storage medium for an access protection accessory in an automation network connected to an automation installation configured to perform an automation process, the digital storage medium comprising program instructions which, upon execution by a processor arranged in the access protection accessory, prompt the access protection accessory to:
- perform the automation process in a first state and read first rules using the processor arranged in the access protection accessory;
- forward data from the access protection accessory by applying the first rules, the first rules defining which data are forwarded from the access protection accessory and which data are not forwarded from the access protection accessory;
- receive at least one signal at a combinational logic module arranged in the access protection accessory, said combinational logic module performing scaling operations or linearization operations in which at least one measurement parameter is compared with at least one associated threshold value, and a state change is detected when the at least one measurement parameter is above or below the at least one threshold values value, and said at least one signal indicating a change in the state of the automation process;
- read second rules from the database; and
- forward the data from the access protection accessory by applying the second rules after the at least one signal is received, the second rules defining which received data are forwarded from the access protection accessory and which received data are not forwarded from the access protection accessory.

* * * * *